US005566193A

United States Patent [19]
Cloonan

[11] Patent Number: 5,566,193
[45] Date of Patent: Oct. 15, 1996

[54] METHOD AND APPARATUS FOR DETECTING AND PREVENTING THE COMMUNICATION OF BIT ERRORS ON A HIGH PERFORMANCE SERIAL DATA LINK

[75] Inventor: Thomas J. Cloonan, Downers Grove, Ill.

[73] Assignee: Lucent Technologies Inc., Murray Hill, N.J.

[21] Appl. No.: 366,706

[22] Filed: Dec. 30, 1994

[51] Int. Cl.⁶ ............................ G06F 11/00; H03M 13/00
[52] U.S. Cl. .................................. 371/49.3; 364/737
[58] Field of Search ............................ 364/737; 371/49.3

[56] References Cited

U.S. PATENT DOCUMENTS

| | | | |
|---|---|---|---|
| 3,889,236 | 6/1975 | Herger et al. | 340/172.5 |
| 4,346,474 | 8/1982 | Sze | 371/49 |
| 4,872,158 | 10/1989 | Richards | 370/58.1 |
| 4,988,993 | 1/1991 | Hwang et al. | 340/825 |
| 4,993,016 | 2/1991 | Richards | 370/54 |
| 5,122,892 | 6/1992 | Cloonan et al. | 359/117 |
| 5,258,987 | 11/1993 | Cloonan et al. | 370/60 |
| 5,311,345 | 5/1994 | Cloonan et al. | 359/139 |
| 5,345,441 | 9/1994 | Paker et al. | 370/54 |

Primary Examiner—Roy N. Envall, Jr.
Assistant Examiner—Monica Lewis
Attorney, Agent, or Firm—Jack R. Penrod

[57] ABSTRACT

A method and apparatus for communicating serial data at very high actual and effective data rates with a high probability of detecting single and multiple bits errors, even burst errors. The method and apparatus generates at least three parity bits which are sent with each serial data word: an even parity bit taken over all the even bits (including bit 0), an odd parity bit taken over all of the odd parity bits, and a third to parity bit that is an even parity bit taken over every fourth data bit. These parity bits are generated and transmitted along with each data word. At the receiving end, the data portion of each received serial word is stored in a register. The parity bit portion of each received serial word is stored in another register within a parity bit checker. The parity bit checker generates three parity bits taken over the received data word in the same manner that the transmitted parity bits were generated. If there are no errors in the data, the parity bits of the received data word should be the same as the parity bits transmitted with the data word. If they are not equal, an error has occurred. This method and apparatus provides error detection that is good as that of ATM data packets, which is it preferred application. Yet all these benefits are provided by a method and apparatus that require very little bandwidth and very little time for detection.

7 Claims, 4 Drawing Sheets

FIG. 4

| # BITS IN BURST ERROR | # UNIQUE POSITIONS FOR BURST ERROR | # DETECTED POSITIONS FOR BURST ERROR | # UNDETECTED POSITIONS FOR BURST ERROR | PROBABILITY THAT THE BURST IS UNDETECTED |
|---|---|---|---|---|
| 1 | 19 | 19 | 0 | 0 |
| 2 | 18 | 18 | 0 | 0 |
| 3 | 17 | 17 | 0 | 0 |
| 4 | 16 | 16 | 0 | 0 |
| 5 | 15 | 14 | 1 | $6.6 \times 10^{-2}$ |
| 6 | 14 | 14 | 0 | 0 |
| 7 | 13 | 13 | 0 | 0 |
| 8 | 12 | 0 | 12 | 1.0 |
| 9 | 11 | 11 | 0 | 0 |
| 10 | 10 | 10 | 0 | 0 |
| 11 | 9 | 9 | 0 | 0 |
| 12 | 8 | 3 | 5 | $6.25 \times 10^{-1}$ |
| 13 | 7 | 6 | 1 | $1.42 \times 10^{-1}$ |
| 14 | 6 | 6 | 0 | 0 |
| 15 | 5 | 5 | 0 | 0 |
| 16 | 4 | 1 | 3 | $7.5 \times 10^{-1}$ |
| 17 | 3 | 2 | 1 | $3.3 \times 10^{-1}$ |
| 18 | 2 | 2 | 0 | 0 |
| 19 | 1 | 1 | 0 | 0 |
| SUM | 190 | 167 | 23 | |

METHOD AND APPARATUS FOR DETECTING AND PREVENTING THE COMMUNICATION OF BIT ERRORS ON A HIGH PERFORMANCE SERIAL DATA LINK

CROSS REFERENCES

This application is related to the following co-pending applications:
"Terabit Per Second Packet Switch", Thomas Jay Cloonan and Gaylord Warner Richards, Filing Date 12/30/94, and Ser. No. 08/366,704;
"Terabit Per Second ATM Packet Switch Having Distributed Out-Of-Band Control", Thomas Jay Cloonan and Gaylord Warner Richards, Filing Date 12/30/94, and Ser. No. 08/367,489;
"Terabit Per Second Packet Switch Having Distributed Out-Of-Band Control of Circuit and Packet Switching Communications", Thomas Jay Cloonan and Gaylord Warner Richards, Filing Date 12/30/94, and Ser. No. 08/366,708;
"Terabit Per Second Distribution Network", Thomas Jay Cloonan and Gaylord Warner Richards, Filing Date 12/30/94, and Ser. No. 08/366,707;
"Apparatus and Method for Reducing Data Losses in a Growable Packet Switch", Thomas Jay Cloonan and Gaylord Warner Richards, Filing Date 12/30/94, and Ser. No. 08/366,705.

TECHNICAL FIELD

The invention relates to serial data communication method and apparatus and more particularly to a serial data method and apparatus which has a bit error detection capability that is as good or better than the bit error detection and correction scheme used by the higher level protocols associated with the data it receives for communication, even in the presence of noise bursts.

DESCRIPTION OF THE PRIOR ART

In many high-performance processing systems, such as switching systems and parallel computing systems, the aggregate bandwidth typically transported between various sub-systems, such as printed circuit boards, card cage shelves, and frames, is continually increasing. For example, switched multimedia services and the broadband ATM switches used to transport multimedia services may contain single circuit boards requiring up to 20 gigabits per second of aggregate bandwidth for data and control signals. If these large bandwidths are routed over parallel data links using moderate data rates (50–100 megabits per second), then a large number of cables will be required to transport the signals. For example, a 20 gigabit per second stream transported over multiple 50 megabit per second links will require as many as 400 input/output connections on a single printed circuit board. If a ground line for characteristic impedance control is associated with each of these input/output connections, then a total of 800 pins are required for this 20 gigabits per second stream. In addition to using up a large number of the available pinouts on a printed circuit board, high speed signals may also require proper characteristic terminations to reduce ringing and reflections if routed over substantial distances, i.e. approximately 0.2 meters or more. Characteristic terminating resistors reduce the ringing and reflections but significantly increase the power requirements and thermal management problems of a printed circuit board.

Because of the many problems associated with the use of moderate-rate parallel data links for the routing data at high aggregate bandwidths, some systems have turned to serial data links which have high-bandwidths, e.g. serial data rates of 600 megabits per second to 2.5 gigabits per second, to replace the multiple moderate-bandwidth parallel data links. Presently, semiconductor industry manufacturers do supply multiplexer/transmitter chips that take many parallel data lines and create a single high-speed data stream. At the receiving end, corresponding receiver/demultiplexer chips are also available. Such semiconductor chips are discussed in "GA9011 and GA9012 Hot Rod Serial Links"; pp. 2.3–2.36, Triquint Data Communications Products Data Book. 1992; published by Triquint Semiconductor, Sunnyvale, Calif.

One of the potential problems associated with using serial data links for routing control or data signals within a system is the possibility that bit errors will occur on the links. For example, most manufacturers specify that their chip sets will provide bit error rates of $10^{-12}$ to $10^{-14}$ when communicating over common coax or optical fiber for typical distances of 10 to 30 meters. A 1 gigabit per second serial data link that has a $10^{-12}$ bit error rate with uniformly distributed errors, would expect a bit error to occur on an average of once every 1000 seconds (or once every 16.6 minutes). Similarly, a 1 gigabit per second serial data link with a $10^{-14}$ bit error rate, would expect a bit error to occur on an average of once every 100,000 seconds (or once every 27.7 hours). If these bit errors were to cause catastrophic failures of the overall system of which these serial data links were a part, then the availability of the overall system would be unacceptable. This problem is exacerbated when manifold serial data links are used within a single system. For example, if a system has X serial data links, each with a bit error rate of $10^{-14}$, then a catastrophic error is likely to occur on average once every (27.7/X) hours.

Error correction codes may be used, but the extra error correction code bits added to the data results in lower bandwidth utilizations. Further, indications are that if bit errors occur, they tend to occur in long bursts that can last several microseconds or longer, possibly induced by some electromagnetic noise generated nearby. The occurrence of long burst errors is discussed by K. Annamalai on pp. 5.11–5.24 of an article entitled "Bit error rate (BER) of the Hot Rod chip set," published by Triquint Data Communications Products Data Book (1992), Triquint Semiconductor, Sunnyvale, Calif. Besides the lower bandwidth utilization, there is a definite limit to the number of bit errors that an error correcting code can correct. The typical long burst would totally defeat an error correcting code and thus little would be gained by the system in return for the bandwidth used up by the error correcting code. Considering that for a 1 gigabit per second serial link, a single burst error may last as long as 1000 sequential bits (i.e., one microsecond of data) and has the potential to corrupt 1000 sequential bits. Most protocol error correcting codes would be ineffective against such burst errors.

Besides the uncertainty of the data caused by burst errors, the corruption of both the level and the waveshape of the data on a serial link may cause another problem. With a burst error, it is possible that the receiver of the link will lose synchronization, making it impossible for the transmitted data to be detected until the receiver has re-acquired synchronization. The synchronization lock-up time for a typical receiver tends to range from several microseconds to several milliseconds, depending on the characteristics of the phase locked loop used to extract clock from the serial data stream. Since error correcting codes cannot change this effect of burst errors, some other type of redundancy, such as multiple data transmissions separated in time or multiple data transmission on multiple serial links with respective receivers, is necessary to provide an adequate level of availability in the presence of burst errors. The problem then becomes how to reasonably and cost-effectively provide fault-tolerance to both single bit and burst errors and also provide an acceptable availability on serial link or links.

One well known redundancy technique is voting, which typically uses three serial links to replace a single serial link. Assuming that only one of the three links is likely to contain an error at any given moment in time, the three way voting system must identify the status (good or in error) of each of the three links, and then use a majority-rule voting scheme to propagate only the data that is carried (in agreement) by at least two of the three serial links. It is worth noting that most errors are assumed to occur along the electrical or optical conductor path, so each conductor should be routed independently. If the bit error rate on any one link is given by $10^{-14}$, then the probability that two or more of the three independent links will have simultaneous errors (resulting in an incorrect vote and an actual output error) is approximately $3 \times 10^{-28}$. This means for a three way voting system using 1 gigabit per second serial links, an actual output error will occur on the average of once every $3 \times 10^{18}$ seconds, i.e., once every $1.1 \times 10^{11}$ years. Thus, a three way voting system provides a level of error protection that is substantially greater than the error rate of the data itself, assuming that the data has the error statistics of Asynchronous Transfer Mode packets. Further, the very high level of error protection of the three way voting system also results in a factor of three increase in the total cost of the links.

It is an object of the present invention to provide approximately the same level of error protection to a system as the three way voting system at a significantly lower cost. It is another object of the present invention to provide approximately the same level of error protection to a system as the three way voting system using only two serial links within the system, thereby resulting in a ⅔ savings in cost, board pinouts, board power, and link volume when compared to a three way voting system.

SUMMARY OF THE INVENTION

Briefly stated, in accordance with one aspect of the invention, the aforementioned objects are achieved by providing a low-cost, bandwidth-efficient error detection and redundancy method used in a high-bandwidth serial transmission links for improving the availability of a communication system.

In a specific embodiment, :the aforementioned objects are achieved by providing an apparatus for converting a parallel data word from a parallel data bus to serial data with error detection bits for most errors, even burst errors, that uses very few error detecting bits. The apparatus includes a register that is connected to the parallel data bus for storing file parallel data word. An error detecting bit generator is also connected to the parallel data bus for generating error detecting bits based upon the parallel data word. The error detecting bit generator generates a first error detecting bit which is an even parity bit over a set of all even data bits of the parallel data word, a second error detecting bit which is an odd parity bit over a set of all of the odd data bits of said parallel data word, and a third error detecting bit which is even parity bit over a set of bits having a first member from one of the first four bits of said parallel data word and subsequent members of the set that are spaced every fourth bit position from said first member. The output bits of the parallel data word register and the error detecting bits of the parity generator are sequentially joined together to form a serial data word. This serial data word is subsequently transmitted over a serial channel to a serial data receiver. At the serial data receiver by checking each error detecting bit with respect to the appropriate parity of its respective set of data bits, the probability of transmitting at least one erroneous bit out of the serial data receiver to an overall system without detection due to the error detecting bits not detecting the error is approximately $1.5 \times 10^{-15}$ even in the presence of burst errors.

BRIEF DESCRIPTION OF THE DRAWING

FIG. 4 is a table showing the expected performance of the serial data system shown in FIGS. 1 and 2.

DETAILED DESCRIPTION

Figure 1:
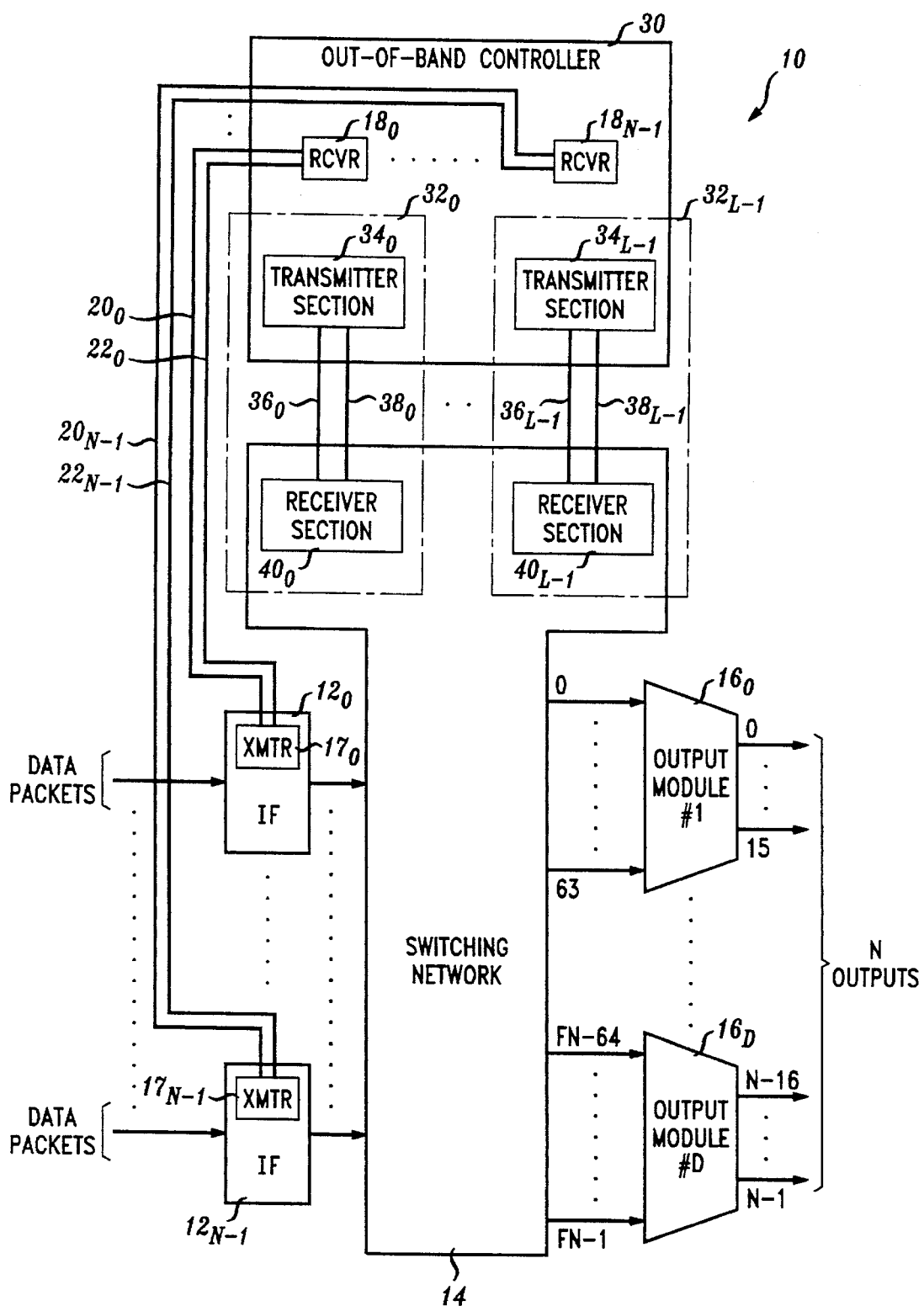
FIG. 1 is a block diagram of a high performance digital switch that has a high performance serial link between its controller and its switching network.

FIG. 1 shows a high performance digital switch 10 for switching data packets from input interfaces $12_0$–$12_{N-1}$ through switching network 14 to output modules $16_0$–$16_D$ and the desired N outputs thereof. Switching network 14 has a fanout F where each of the outputs from the input interfaces $12_0$–$12_{N-1}$ is fanned out to F inputs within switching network 14, such that if the combination of the switching network 14 and the output modules $16_0$–$16_D$ is an N×N switch then switching network 14 will have FN internal inputs and FN outputs, 0 to FN–1, connected to output modules $16_0$–$16_D$. Output Modules $16_0$–$16_D$ have a fanin or concentration factor of F in order to convert the FN outputs, 0 to FN–1, of the switching network 14 to N output module outputs, 0 to N–1. Each of the input interfaces $12_0$–$12_{N-1}$ upon receiving a data packet reads the destination field of the data packet and forwards that information along connections $20_0$–$20_{N-1}$ and $22_0$–$22_{N-1}$ to out-of-band controller 30. Connections $20_0$–$20_{N-1}$ and $22_0$–$22_{N-1}$ may be dually redundant high performance serial links, as described later. Each input interface $12_0$–$12_{N-1}$ has a respective transmitter section $17_0$–$17_{N-1}$ to which the serial links $20_0$–$20_{N-1}$ and $22_0$–$22_{N-1}$ connect. The serial links $20_0$–$20_{N-1}$ and $22_0$–$22_{N-1}$ connect to respective receivers $18_0$–$18_{N-1}$ of the out-of-band controller 30. Out-of-band controller 30 receives a desired destination for each of the N input data packets and hunts a respective path through switching network 14 for the data packet during each packet data cycle. Once each of the paths have been determined, out-of-band controller 30 produces control signals and communicates these control signals to switching system 14 to set up N paths (assuming that no packets were blocked, otherwise only slightly less than N paths would be set up) by way of high performance serial data systems $32_0$–$32_{L-1}$. The control signals communicated by each of the serial data systems $32_0$–$32_{L-1}$ instruct switches, typically crossbar switches of some type in one or more stages, to establish connections from the outputs of the input interfaces $12_0$–$12_{N-1}$ to the concentrator inputs in the output modules $16_0$–$16_D$ in order to connect the packets to their respective destination lines. Since there are N paths to set up and the time allotted in the packet data cycle is very brief, e.g., a few nano seconds, the serial data systems $32_0$—$32_{L-1}$ must communicate at data rates of 1 gigabit per second or higher. If a bit error occurs to a control packet, the error may cause the inadvertent loss of a data packet by routing an input data packet to an improper output. Since some data can not be recovered if lost, it is important that the serial data systems $32_0$–$32_{L-1}$ communicate the control signals to the switching network 14 with an extremely low bit error rate.

In the embodiment of the invention shown in FIG. 1, dually redundant high-bandwidth serial links $20_0$–$20_{N-1}$, $22_0$–$22_{N-1}$, $36_0$–$36_{L-}$, and $38_0$–$38_{L-1}$ are used instead of either the low-availability single links described above or the three way voting scheme to communicate control data from line interfaces $12_0$–$12_{N-1}$ to controller 30, and from controller 30 to switching network 14. Since there can be no majority vote with only two redundant serial data links for each control data path if an error occurs, some technique must be used at the transmitters $17_0$–$17_{N-1}$, and $34_0$–$34_{L-1}$ and the receivers $18_0$–$18_{N-1}$ and $40_0$–$40_{L-1}$ to determine which of the two serial data links of a path is in error.

Figure 2:
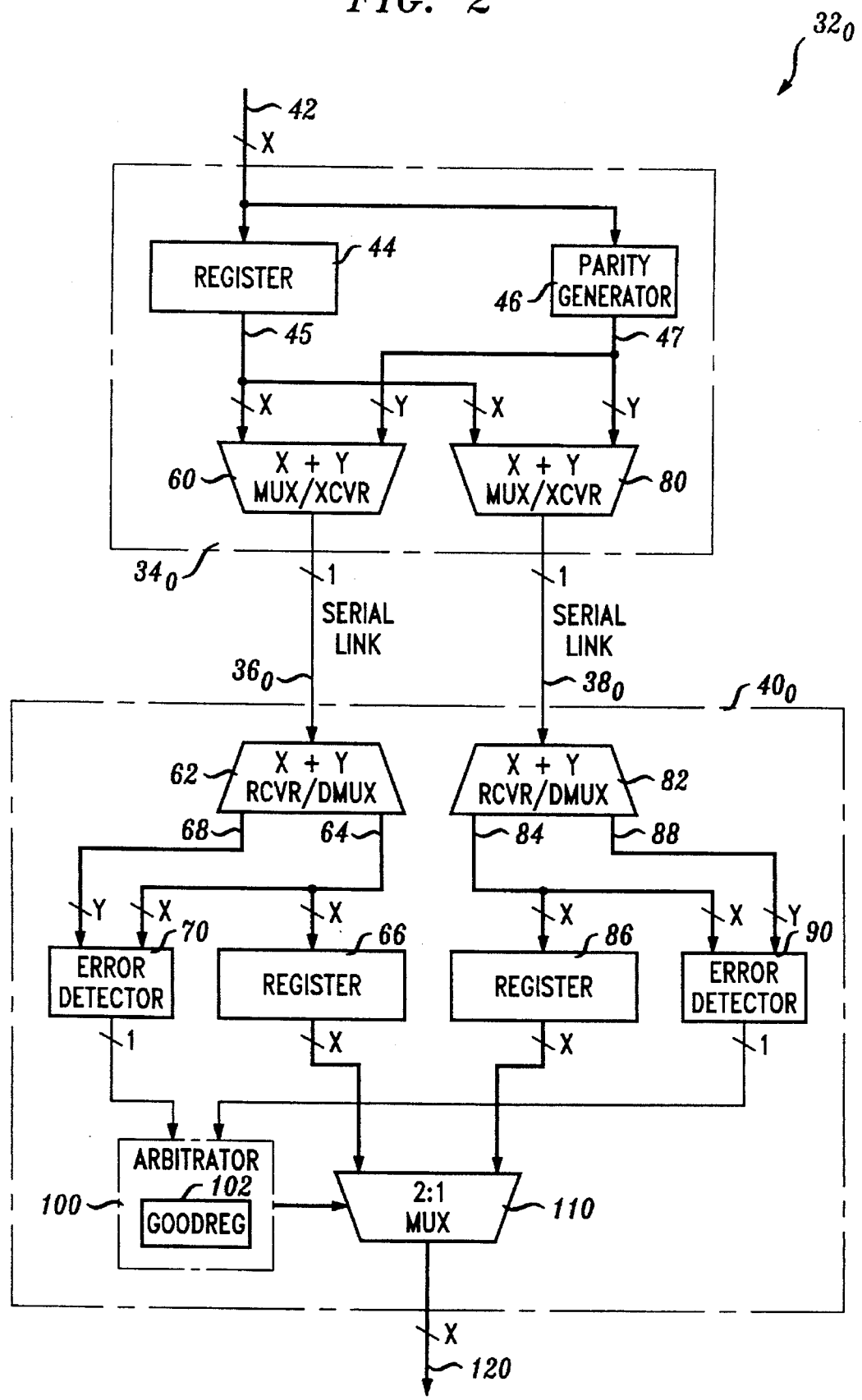
FIG. 2 is a block diagram of a dually redundant serial data system connecting the controller and the switching network of FIG. 1, with each link having specialized parity circuits specifically to detect multiple bit errors from an error burst within the data streams.

Referring now to FIG. 2, a representative serial data path comprising dually redundant serial data links $36_0$ and $38_0$ and serial data system $32_0$ is shown in greater detail. In the transmitter $34_0$ of the serial data system $32_0$, an X-bit parallel word is loaded from parallel bus 42 into a register 44 and a parity bit word generator 46. The outputs from register 44 and parity bit word generator 46 are connected by respective parallel buses 45, 47 to two distinct multiplexer/transmitter chips 60, 80. Each of the multiplexer/transmitter chips 60, 80 converts the outputs on the parallel buses 45, 47 into respective serial data words, which would always be identical if errors did not occur. These serial data words are dual redundant and contain X bits of the input parallel data word plus Y bits from the parity generator 46. These dual redundant serial data words are routed through the two serial links $36_0$ and $38_0$. In an ideal arrangement, the two cables $36_0$, $38_0$, each carrying a respective serial data word, would be physically routed through separate cable trays to prevent any environmental noise that couples into one cable from coupling into the other cable.

At the receiver $40_0$, the two serial data words are received from cables $36_0$, $38_0$ and conveyed to two receiver/demultiplexer chips 62, 82. Each receiver/demultiplexer chip 62, 82 determines of the word boundaries for the (X+Y) bit serial words. Subsequently, each receiver/demultiplexer chip 62, 82 decomposes its received (X+Y) bit word into an X-bit parallel data word in response to the serial data word it received on its respective cable $36_0$, $38_0$. Each parallel data word is connected at its respective parallel output ports to parallel buses 64, 84 and from parallel buses 64, 84 to registers 66, 86. Receiver $40_0$ must then determine if either of the two X-bit words in registers 66, 86 has been corrupted by the high-bandwidth serial links $36_0$, $38_0$. To make this determination, receiver $40_0$ uses the respective Y bits (from the parity generator 46) which are transmitted over serial links $36_0$, $38_0$ with each X bit data word.

Each of the receiver/demultiplexer chips 62, 82 produces a Y bit wide parallel error detector word corresponding to the error detection bits of each serial data word received. The Y bit error detection words are connected by parallel buses 68, 88 to respective error detectors 70, 90. Error detectors 70 and 90 are also connected to parallel buses 64 and 84. Error detectors 70, 90 perform and the same parity checks are performed by parity bit word generator 46 and compares the results of the received parallel data word with the Y bit error detection word received. If no error occurs, then they will be identical.

The occurrence of burst errors within the system 10 precludes the use of a single parity bit across a data word. If the burst corrupts an even number of bits within the word, then the parity bit will not identify the errors in the word. Total duplication (re-transmission) of the data on each link is possible (essentially assigning a single even parity bit to each of the data bits in the word), but this results in a very inefficient 50 percent utilization of the link bandwidth. Thus, the present invention uses a Y-bit error detection word. This is a more desirable and efficient approach and yet one that is likely to catch a very high percentage of single bit and burst bit errors.

With the Y-bit error detection word, an arbiter 100 is used to determine (if any) whether the received parallel data word in register 66 or the received parallel data word in register 86 should be routed through the 2:1 multiplexer 110 to the output parallel bus 120. The arbiter 100 selects the error-free link, assuming at least one of the two available received parallel data words is error-free, and then routes that received parallel word through the 2:1 multiplexer 110 to the parallel output bus 120. If both links are found to be error-free, then the arbiter 110 can use one of two arbitration schemes: 1) randomly select one of the two links to be routed through the 2:1 multiplexer or 2) retain a memory identifying which of the two links last experienced an error and continuously identify the opposite link as the presently more reliable of the two and route this reliable link through the 2:1 multiplexer 110 until a new error occurs on one of the two links $36_0$, $38_0$ and associated circuits. The second of these approaches is shown in the arbiter logic flow diagram of FIG. 3.

Figure 3:
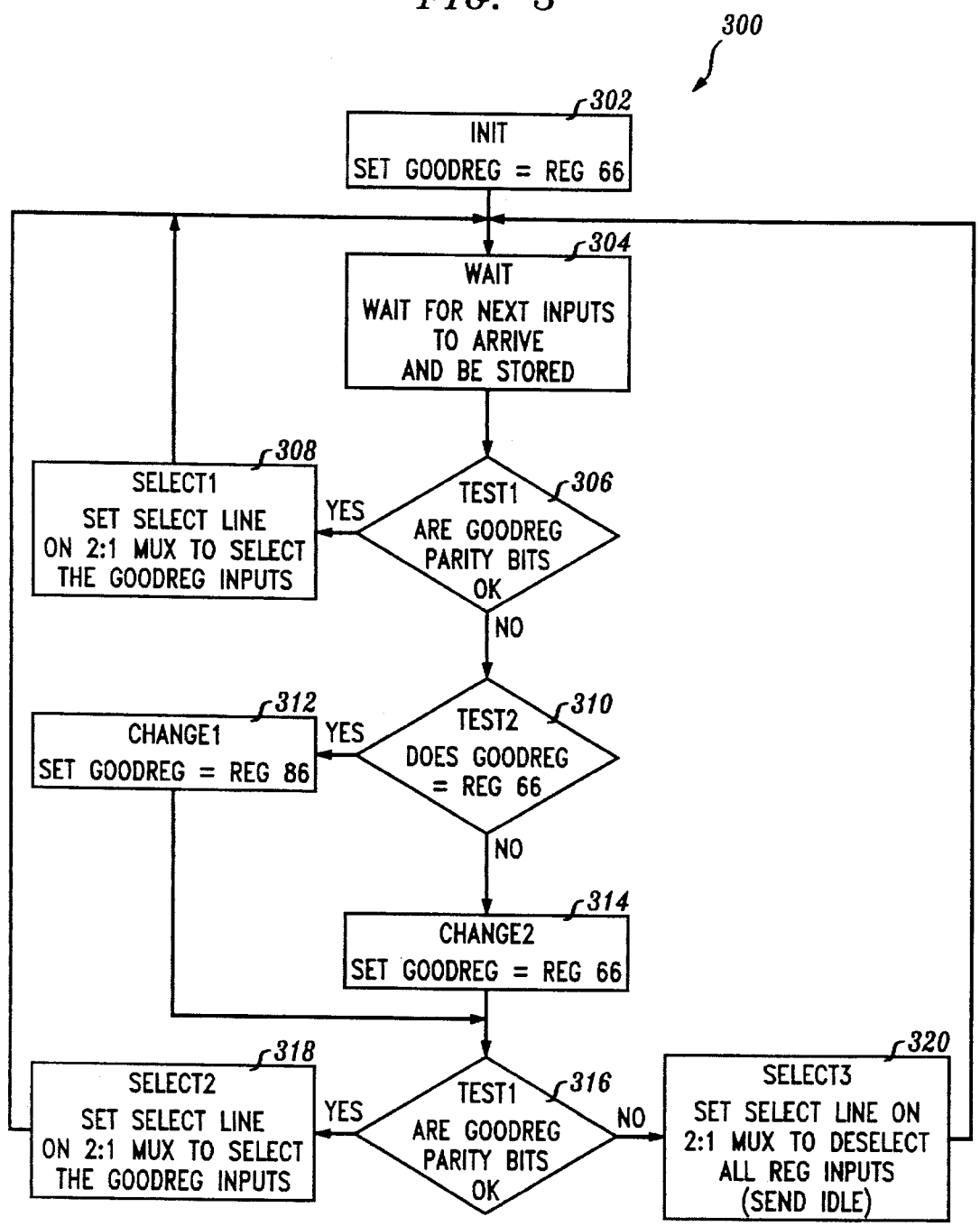
FIG. 3 is a flow diagram of an arbitration method used to determine which, if either, of the dual sets of received data shall be selected as the system output.

Referring now to FIGS. 2 and 3, a method 300 for detecting errors occurring in dual redundant high speed serial data bus system is shown and described. Method 300 begins with initialization step 302 where arbiter register 102 designated GOODREG is initialized by setting a bit thereof to designate that register 66 contains valid data as a default setting. Next, step 304 of the arbiter method waits a period of time for storing a received parallel data word communicated via serial bus $36_0$ into register 66, storing a received error detection word communicated via the serial $36_0$ for the received parallel data word into a register of a first error detector 70, storing a redundant received parallel data word communicated via serial data bus $38_0$ into register 86, and storing a second received error detection word communicated via the serial data bus $38_0$ for the redundant received parallel data word into a register of a second error detector 90. After all of these data items are stored, the arbiter 100 can progress to step 306. At step 306 a local error detection word is generated from the received parallel data word in said first error detector 70 in substantially the same manner that the received error detection word was generated before it was transmitted via serial data bus $36_0$. Similarly at step 306 a second local error detection word is generated from the redundant received parallel data word in the error detector 90 in substantially the same manner that the second received error detection word was generated before it was transmitted via the redundant serial data bus.

Step 306 further reads the arbiter register 102 to determine whether register 66 or register 86 is presently designated GOODREG for logic operations. Then, step 306 compares the received error detection word corresponding to the register 66 or 86 that is presently designated GOODREG with the local error detection word thereof and if the error detection words are equal moving to step 308 and if the error detection bits are not equal, continuing to step 310. At step 308, arbiter 100 selects outputs of the register that is presently designated by the GOODREG 102 to be transmitted via a two-to-one multiplexer 110 to the switching network 14 and jumping back to step 304 to process the next pair of redundant serial data words. Method 300 got to step 310 because the error detector bits indicated an error, so at step 310 a determination is made which of the registers 66, 86 presently designated as GOODREG 102 by testing to see if GOODREG 102 presently designates register 66. If the result of the test of step 310 is yes, then some type of error has been detected in the contents of register 66 then the method 300 progresses to step 312 where arbiter register 102 changes from designating register 66 as GOODREG to designating register 86 as GOODREG and the register containing valid data. From step 312, method 300 progresses to step 316. If, on the other hand, the result of the test of step 310 is no, then some type of error has been detected in the contents of register 86 and the method progresses to step 314 where the register 102 designated as GOODREG is changed from register 86 to register 66 as the register containing valid data. From step 314, the method 300 progresses to step 316.

Step 316 reads the arbiter register 102 to determine whether register 66 or register 86 is presently designated GOODREG for logic operations. Then, step 316 compares the received error detection word corresponding to the register presently designated GOODREG with the local error detection word thereof and if the error detection words are equal moving to step 318 and if the error detection bits are not equal, moving to step 320. At step 318, the present register 66 or 86 designated by GOODREG has valid data and the contents of that register is transmitted via a two-to-one multiplexer 110 to the switching network 14. After step 318 method 300 continues to step 304 to detect any errors in the next pair of redundant serial data words. On the other hand, since the only way to arrive at step 320 is to have errors detected in the received data words stored in both register 66 and in register 86, there is no valid data to be transmitted, so step 320 instructs 2:1 multiplexer to 110 deselect both registers 66 and 86, i.e., have 2:1 multiplexer 110 transmit an idle word to switching network 14. After step 320, method 300 continues to step 304 to detect any errors in the next pair of redundant serial data words.

Some form of delay (serial shift registers or parallel registers) may be required to provide time for the error detection and arbitration calculations of method 300 to be performed, but such delays are known in the digital system art.

Although the lengths of X and Y may take on various values, preferably X=16 bits and Y=3 bits. With these values, the error detection word, referred to collectively as the parity bits, will consume only 15.7 percent of the total bandwidth on the serial link. The sixteen data bits can be identified by the binary representation:

$$D_{15}D_{14}D_{13}D_{12}D_{11}D_{10}D_9D_8D_7D_6D_5D_4D_3D_2D_1D_0$$

The three parity bits appended to each data word can be identified as $P_0$, $P_1$, and, $P_2$ so the resulting X+Y=19 bit word (with a 16-bit data field and a 3-bit parity field) will contain bits organized on the serial links 36, 38 as shown below:

$$P_2P_1P_0D_{15}D_{14}D_{13}D_{12}D_{11}D_{10}D_9D_8D_7D_6D_5D_4D_3D_2D_1D_0,$$

where bit $D_0$ is transmitted on the link first (from a temporal point of view) and $P_2$ is transmitted on the link last. Each of these three parity bits must be defined in a very specific manner to provide the extensive fault-coverage described above. $P_0$ is defined to be an even parity bit over all of the even-numbered data bits (where even parity is defined to be a logic "1" if there are an odd number of logic "1"s among these data bits and a logic "0" if there are an even number of logic "1"s among these data bits). $P_1$ is defined to be an odd parity bit over all of the odd-numbered data bits (where odd parity is defined to be a logic "0" if there are an odd number of logic "1"s among these data bits and a logic "1" if there are an even number of logic "1"s among these data bits). $P_2$ is defined to be an even parity bit over bits $D_2$, $D_6$, $D_{10}$, and $D_{14}$—i.e., over a group of bits that are spaced four bits apart. Each of these parity bits can be easily calculated by exclusive-ORing all of the data bits that are associated with the particular parity bit, as shown in the Boolean expressions below.

$P_0$=$D_{14}$XOR $D_{12}$XOR $D_{10}$XOR $D_8$XOR $D_6$XOR $D_4$XOR $D_2$XOR $D_0$ $P_1$=($D_{15}$XOR $D_{13}$XOR $D_{11}$XOR $D_9$XOR $D_7$XOR $D_5$XOR $D_3$XOR $D_1$)'

$P_2$=$D_{14}$XOR $D_{10}$XOR $D_6$XOR $D_2$

When defined in this fashion, the error detection arrangement provides another benefit, because each error detection circuit 70, 90 only needs to perform logic on at most one half of the bits in the data field, fairly rapid parity checks can be performed. This means that the aforementioned delay (needed to select which of the two data words should be routed through the 2:1 multiplexer 110) can be a minimal amount of delay, thus resulting in lowered data latencies.

IN OPERATION

Using these three parity bit definitions, many single bit and contiguous bit burst error conditions within the data field can be detected by the receiver circuitry. For example, $P_0$ will detect all single bit errors on even-numbered data bits, all double-bit contiguous burst errors, all triple-bit contiguous burst errors that begin on an odd-numbered bit, all five-bit contiguous burst errors that begin on an even-numbered bit, all six-bit contiguous burst errors, all seven-bit contiguous burst errors that begin on an odd-numbered bit, all nine-bit contiguous burst errors that begin on an even-numbered bit, all ten-bit contiguous burst errors, all eleven-bit contiguous burst errors that begin on an odd-numbered bit, all thirteen-bit contiguous burst errors that begin on an even-numbered bit, all fourteen- bit contiguous burst errors, all fifteen-bit contiguous burst errors that begin on an odd-numbered bit, and all stuck-at-one burst errors that cover the entire word (because $P_0$ is defined as an even parity bit). $P_1$ will detect all single bit errors on odd-numbered data bits, all double-bit contiguous burst errors, all triple-bit contiguous burst errors that begin on an even-numbered bit, all five-bit contiguous burst errors that begin on an odd-numbered bit, all six-bit contiguous burst errors, all seven-bit contiguous burst errors that begin on an even-numbered bit, all nine-bit contiguous burst errors that begin on an odd-numbered bit, all ten-bit contiguous burst errors, all eleven-bit contiguous burst errors that begin on an even-numbered bit, all thirteen-bit contiguous burst errors that begin on an odd-numbered bit, all fourteen-bit contiguous burst errors, all fifteen-bit contiguous burst errors that begin on an even-numbered bit, and all stuck-at-zero burst errors that cover the entire word (because $P_1$ is defined as an odd parity bit). $P_2$ will detect all four-bit contiguous burst errors and all stuck-at-one burst errors that cover the entire word (because $P_2$ is also defined as an even parity bit).

It can be shown that for each burst error of length L ($1 \leq L \leq (X+Y)=19$), the position of the burst error within the data field and parity field of a word (block) will determine whether or not the burst error will be detected by the three parity bits. (Note: Burst errors with burst lengths exceeding 19 bits can be decomposed into several sets of burst errors across several words with burst lengths less than or equal to 19 bits. This decomposition will be used in the analyses below). For a 16-bit word (plus three parity bits), FIG. 4 indicates the number of different positions within the 19-bit word in which a contiguous bit burst error of length L can exist for ($1 \leq L \leq (X+Y)=19$). For each of these burst lengths, FIG. 4 also indicates the number of positions for which this burst length is detected by the three parity bits and the number of positions for which this burst length will not be detected by the three parity bits. From these values, the probability that an L-bit burst error will be not be detected by the three parity bits within a word is also calculated. (given that the L-bit burst error does exist). In general, it can be seen that 167 of the 190 total possible positions for the burst errors will be detected, so the three-bit parity arrangement of the present invention can detect 87.8 percent of the various burst errors that can corrupt a 19-bit word. For the circuitry in FIG. 2, there are two ways that incorrect data can be passed through the 2:1 multiplexer 110 to the output port: 1) an error occurs in one of the two incoming data streams and the error is not detected by the 3-bit parity detection scheme and the 2:1 multiplexer 110 is randomly set up to route the erroneous data to the output, or 2) simultaneous errors occur and are detected on both incoming data streams, so the arbiter 100 does not select either of the streams (instead, it sends some pre-defined idle code through to the outputs). Thus, the probability of passing incorrect data through to the output port is the probability of either of the previously mentioned events occurring.

In order to approximately determine (to a first order) the probability of passing a corrupt bit through the 2:1 multiplexer of FIG. 2 to the output (because an error was not detected by the simple Y-bit parity scheme), several simplifying assumptions can be made. First, assume that only contiguous bit burst errors ranging in duration from 1 bit to X+Y=19 bits will occur within a word transmitted across the serial link in the system. Second, it is assumed that a burst error is the type of error that "flips" the state of each of the bits within the burst period. It is worth noting that if bursty errors occur which force all of the bits within the burst period to a specific logic state, e.g., the logic "1" state, then for a random pattern of bits within the data field, these bursty error no longer satisfy the definition of a burst error as defined above, because logic "0"s in the data field are corrupted but logic "1"s would be received correctly. Analysis of bursty errors would be more complex, but is still a straight-forward extension of the analysis applied to the burst errors, so a general indication of the results to bursty errors is provided by the following results also. For example, some applications, as the control system of a large ATM switch wherein path route request vectors are usually filled with "0"s, the data field will usually contain long strings of "1"s or long strings of "0"s. For such applications, bursty errors will look like the previously-defined burst errors. Thus, the results of the first order following analysis are applicable to burst errors and bursty errors for the control systems of many ATM types of systems. Third, it is also assumed that within a given period of time T, an equal number of bit errors are caused by each of the burst error types. This assumption is necessary, because actual distributions of the burst lengths are not known at this time. Fourth, it is also assumed that a burst error can occur at any position throughout the 19-bit word, and its position is selected entirely at random. As a result of these assumptions, it can be shown that the probability of seeing a L-bit burst error start during a particular bit interval is given by: P(L-bit burst error starts)=BER/[(X+Y)×L] where BER is the average bit error rate on the serial link. Thus, the probability of seeing a 1-bit burst starting is 19 times higher than the probability P of seeing a 19-bit burst starting within the given period of time T. It can therefore be shown that:

$$
\begin{aligned}
P(\text{passing corrupt bits through 2:1 multiplexer}) &= \sum_{L=1}^{X+Y} L \times P(L\text{-bit burst error starts}) \times \\
&\quad P(\text{not detecting an } L\text{-bit burst}) \times P(\text{bad channel routed through multiplexer}) \\
&= \sum_{L=1}^{X+Y} L \times [BER/((X+Y) \times L)] \times P(\text{not detecting an } L\text{-bit burst}) \times 0.5 \\
&= [0.5 \times BER/(X+Y)] \sum_{L=1}^{X+Y} P(\text{not detecting an } L\text{-bit burst})
\end{aligned}
$$

If X=16, Y=3, the actual average bit error rate on a single serial link is given by BER=$1 \times 10^{-14}$, and the P(not detecting an L-bit burst) values are taken from FIG. 4 (resulting in $\Sigma_{L=1}^{X+Y}$ P(not detecting an L-bit burst)=2.9, then the probability of passing corrupt bits through the 2:1 multiplexer due to the three parity bits not detecting the error is approximately $7.6 \times 10^{-16}$.

If 1 gigabit per second serial links are used, then on average, an error will occur on one serial link every 100,000 seconds (or once every 27.7 hours), and an error will be passed through the 2:1 multiplexer every 1,315,789 seconds (or once every 15.2 days).

The probability that two simultaneous errors will occur on the two serial links (resulting in an unavoidable condition where corrupt data in the form of an idle code is sent to the output) can also be calculated using the above assumptions. Assuming the BER of a single link is $1 \times 10^{-14}$, the probability that at least one bit or burst error will occur within a single 19-bit word is approximately $19 \times 10^{-14}$, and the probability that two 19-bit words will simultaneously encounter a bit error (resulting in an error being propagated to the output) is given approximately by $3.6 \times 10^{-26}$.

This value is probably just as good as the value for a three way voting system, because if 1 gigabit serial links are used, an actual output error in the current scheme will occur once every $92.7 \times 10^{16}$ seconds, i.e., once every $8.7 \times 10^8$ years. Even in the unlikely event that every bit error forces the receiver to lose synchronization for a microsecond and corrupts 1000 extra bits, this will effectively increase the bit error rate to a value of $1\times10^{-11}$. The resulting system will then have simultaneous errors on both links only once every $2.7\times10^{10}$ seconds, i.e., once every 878 years.

By combining the results above, it can be seen that the probability of routing a corrupt bit through to the output port is dominated by the probability that the three bit parity scheme will not detect an error. As a result, assuming 1 gigabit per second links and assuming all of the above assumptions are correct, then the probability that an erroneous bit will be routed to the output port of a dual redundant serial link is $7.6\times10^{-16}$. The error detection scheme described in the example system above used three parity bits to identify a large percentage of the bit errors in a 16-bit data word. If data words longer than 16 bits in length are used or if more error coverage is desired on the 16-bit data word, then more parity bits can be added to the parity field. In general, the parity field should always contain the parity bits $P_0$ and $P_1$ as defined above (or their Boolean equivalents). Additional parity bits can be added to the parity field using the following relationship for $P_i$ for i equal to or greater than 2:

$$P_i = D_2{}^{i-1}{}_{+0\times2^i}\text{XOR}\ D_2{}^{i-1}{}_{+1\times2^i}\text{XOR}\ D_2{}^{i-1}{}_{+2\times2^i}\text{XOR}\ D_2{}^{i-1}{}_{+3\times2^i}\text{XOR}$$

where the exclusive-OR chain continues until it extends beyond the most-significant bit in the data word.

In an ATM system, for example, the corruption of a bit in the transmission between the out-of-band controller 30 and the switching network 14 produces an effect which is identical to the problem caused by a bit error occurring in the VPI or VCI of an ATM cell header during long-distance transmission between switching offices—i.e., cells are incorrectly routed. So an ATM switch design should guard against this effect even if it increases the system cost. Even in the specification of the ATM cell where most of the link-level error protection and flow control was eliminated in an attempt to minimize the cell length, error detection over the VPI AND VCI data fields was deemed important enough to expend an entire byte within the 53-byte cell to provide for Header Error Control (HEC). The HEC includes a BCH (Bose-Chadhuri-Hocquenghem) error correction code that permits single bit errors within the header (not the data field) to be corrected, and many multiple bit errors to be detected. In fact, up to 84 percent of all burst errors are detected by the 8-bit BCH code operating over the entire 40-bit header of an ATM cell or packet. If a multiple bit error is detected but not corrected, then the cell should be discarded, since it would most probably be misrouted anyway. Thus, the ATM standard strongly guards against misrouted cells.

Similarly, an ATM system design should also guard against errors in the links between the line cards $12_0$–$12_{N-1}$ and the controller 30 that would result in misrouted cells. Further, an ATM system hardware design should follow the ATM standard and discard cells (i.e., not route them) if the connection requests passed between the line cards $12_1$–$12_{N-1}$ and the out-of-band controller 30 if an error is detected. Thus, ATM system 10 of FIG. 1 shows dually redundant serial links $20_0$–$20_{N-1}$, $22_0$–$22_{N-1}$ and associated circuits according to the present invention, as well as dually redundant serial links $36_0$–$36_{L-1}$, $38_0$–$38_{L-1}$, for conveying control information. For the serial links $20_0$–$20_{N-1}$, $22_0$–$22_{N-1}$, $36_0$–$36_{L-1}$, and $38_0$–$38_{L-1}$, the analysis presented previously shows that dual redundant serial links with 3-bit parity will provide error correction over single-bit errors with a probability of $(1-3.6\times10^{-26})$ (assuming both arriving words do not have simultaneous errors). The three parity bits used for burst error detection also provide detection of 87.8 percent of the various burst errors that can corrupt the 19-bit word. As a result, the dual redundant serial links 36, 38 with three-bit parity error detection provide more than adequate protection against mis-routed ATM cells, because the protection provided is as good if not better than the BCH codes used to detect errors in the VPI and VCI of the incoming ATM cell, which is 84 percent coverage on the various burst errors.

Thus, it will now be understood that there has been disclosed a method and apparatus for detecting single bit errors and most burst errors within high speed serial data links that protects against the transmission of an error which functions as well as the method used for correction within the ATM packet header with which the control system is presented. This is accomplished at a very low cost in hardware and bandwidth. Furthermore, the method and apparatus eliminates the need for re-transmission of data, which because of real time constraints associated with ATM packet header processing is highly undesirable. While the invention has been particularly illustrated and described with reference to preferred embodiments thereof, it will be understood by those skilled in the art that various changes in form, details, and applications may be made therein. For example, if longer control words are desired or higher error detection rates are desired, more parity bits may be used. It is accordingly intended that the appended claims shall cover all such changes in form, details and applications which do not depart from the true spirit and scope of the invention.

What is claimed is:

1. An apparatus for converting a parallel data word from a parallel data bus to serial data with error detection bits comprising:

a register connected to said parallel data bus for storing said parallel data word;

an error detecting bit generator connected to said parallel data bus for generating error detecting bits based upon the parallel data word;

said error detecting bit generator generates:

a first error detecting bit which is an even parity bit over a set of all even data bits of said parallel data word;

a second error detecting bit which is an odd parity bit over a set of all of the odd data bits of said parallel data word; and a third error detecting bit which is even parity bit over a set of bits having a first member from one of the first four bits of said parallel data word and subsequent members of the set that are spaced every fourth bit position from said first member;

means for concatenating said parallel data word and said error detecting bits; and means for serially transmitting said concatenated parallel data word and said first, second and third error detecting bits;

wherein, by checking each error detecting bit with respect to the appropriate parity of its respective set of data bits, the probability of transmitting at least one erroneous bit without detection due to the three error detecting bits not detecting the error is approximately $1.5\times10^{-15}$ even in the presence of burst errors.

2. The apparatus as set forth in claim 1, wherein a new parallel data word is converted and transmitted for a subsequent cycle of said parallel data bus.

3. The apparatus as set forth in claim 1, further comprising a first serial data bus connected to an output of said means for serially transmitting for transporting said concatenated parallel data word and said first, second and third error detecting bits.

4. The apparatus as set forth in claim 3, further comprising:

second means for serially transmitting said concatenated parallel data word and said first, second and third error detecting bits; and a second serial data bus connected to an output of said second means for serially transmitting for transporting said concatenated parallel data word and said error detecting bits along a separate route than said first serial data bus;

wherein by checking each of said error detecting bits with respect to the appropriate parity of its respective set of data bits, the probability of transmitting at least one erroneous bit without detection due to the three error detecting bits not detecting the error at the end of each of said first and said second serial data buses is approximately $7.6 \times 10^{-16}$ even in the presence of burst errors.

5. An apparatus for communicating a data word from a first parallel data bus to a second parallel data bus via a serial data link with a very low probability of communicating an undetected error comprising:

a register connected to said first parallel data bus for storing said data word;

an error detecting bit generator connected to said parallel data bus for generating error detecting bits based upon the data word;

said error detecting bit generator generates:
  a first error detecting bit which is an even parity bit over a set of all even data bits of said data word;
  a second error detecting bit which is an odd parity bit over a set of all of the odd data bits of said data word; and
  a third error detecting bit which is even parity bit over a set of bits having a first member from one of the first four bits of said data word and subsequent members of the set that are spaced every fourth bit position from said first member;

means for concatenating said data word and said error detecting bits into a serial data stream; and means for serially transmitting said serial data stream;

a serial data bus connected to said serially transmitting means for transporting said serial data stream;

means for serially receiving said serial data stream connected to said serial data bus for receiving said serial data stream;

means for converting said serial data stream to a received data word and received error detecting bits;

a register connected to said serial data stream converting means for storing said received data word;

a second error detecting bit generator connected to said second parallel data bus for generating error detecting bits based upon the received data word;

said second error detecting bit generator generates:
  a first error detecting bit which is an even parity bit over a set of all even data bits of said received data word;
  a second error detecting bit which is an odd parity bit over a set of all of the odd data bits of said received data word; and
  a third error detecting bit which is even parity bit over a set of bits having a first member from one of the first four bits of said received data word and subsequent members of the set that are spaced every fourth bit position from said first member; and means for comparing error detecting bits from said serial data stream to said error detecting bits generated by said second error detecting bit generator and if said two sets of error detecting bits are not equal, then inhibiting the transmission of said received data word from said register connected to said serial data stream converting means for storing said received data word.

6. The apparatus as set forth in claim 5, wherein a new data word is converted and transmitted for a subsequent cycle of said first parallel data bus.

7. A method for detecting errors occurring in a first path or a second path of a high speed serial data bus system, comprising the steps of:

a. initializing an arbiter register by setting a bit thereof to designate a first register as a logical good register which contains valid data;

b. storing a received parallel data word communicated via the first path into the first register;

c. storing a received error detection word communicated via the first path for said received parallel data word into a register of a first error detector;

d. storing an other received parallel data word communicated via the second path into a second register;

e. storing an other received error detection word communicated via the second path for said other received parallel data word into a register of a second error detector;

f. generating a local error detection word from said received parallel data word in said first error detector in substantially the same manner that said received error detection word was generated before it was communicated via said first path;

g. generating an other local error detection word from said other received parallel data word in said second error detector in substantially the same manner that said other received error detection word was generated before it was communicated via said second path;

h. reading the arbiter register to determine whether said first register or said second register is presently the logical good register;

i. comparing the received error detection word corresponding to the register that is presently the logical good register with the local error detection word thereof and if the error detection words are equal, selecting outputs of the register that is presently the logical good register to be transmitted via a two-to-one multiplexer to the switching system and jumping to step b. for a next serial data word and if the error detection bits are not equal, continuing to step j;

j. changing the arbiter register to change the register that is presently selected as the logical good register; and k. comparing the received error detection word corresponding to the register that is presently the logical good register with the local error detection word thereof and if the error detection words are equal, selecting outputs of the register that is presently the logical good register to be transmitted via a two-to-one multiplexer to the switching system and jumping to step b. for a next serial data word and if the error detection bits are not equal, deselecting said the outputs of said register and sending an idle code, and continuing to step b. for a next serial data word.

* * * * *